(12) United States Patent
Lee et al.

(10) Patent No.: US 7,404,727 B1
(45) Date of Patent: Jul. 29, 2008

(54) MEMORY CARD CONNECTOR

(75) Inventors: Yun-Chien Lee, Tu-Cheng (TW);
Chung-Hsin Huang, Tu-Cheng (TW);
Mei-Chuan Yang, Tu-Cheng (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/712,973

(22) Filed: Mar. 2, 2007

(51) Int. Cl.
*H01R 24/00* (2006.01)
(52) U.S. Cl. .................................... 439/326; 439/630
(58) Field of Classification Search ................ 439/326, 439/630
See application file for complete search history.

(56) References Cited

U.S. PATENT DOCUMENTS

| | | | | |
|---|---|---|---|---|
| 5,933,328 | A * | 8/1999 | Wallace et al. | 361/737 |
| 6,623,304 | B2 * | 9/2003 | Harasawa et al. | 439/630 |
| 6,951,472 | B2 * | 10/2005 | Shih | 439/326 |
| 7,066,766 | B2 * | 6/2006 | Harasawa et al. | 439/630 |
| 7,160,129 | B2 * | 1/2007 | Yin | 439/331 |
| 7,232,326 | B2 * | 6/2007 | Uchida et al. | 439/326 |
| 2005/0106920 | A1 * | 5/2005 | Shih | 439/326 |
| 2006/0270263 | A1 * | 11/2006 | Hirata | 439/326 |
| 2007/0111603 | A1 * | 5/2007 | Wang | 439/630 |

\* cited by examiner

*Primary Examiner*—Gary F. Paumen
(74) *Attorney, Agent, or Firm*—Rosenberg, Klein & Lee

(57) ABSTRACT

A memory card connector includes a housing with a base, a cover, multiple electric terminals installed on the top surface of the base. The base has a left fixing hole and a right fixing hole penetrating its surface. Both sides of the base extend upwards to form a first wall and a second wall. The first wall has a left passageway at its back. The second wall has a right passageway at its back. The cover has a left back board with a left rivet and a left fixing arm. A right back board has a right rivet and a right fixing arm. The cover and the housing are assembled after the rivets are received in the corresponding passageways respectively. After the cover is opened, the fixing arms are inserted into the corresponding fixing holes respectively so that the cover can't come off the housing.

6 Claims, 8 Drawing Sheets

MEMORY CARD CONNECTOR

BACKGROUND OF THE INVENTION

1. Field of the Invention

The present invention relates to a memory card connector, and more particularly to a memory card connector having a compact structure designed to prevent the cover from coming off the housing.

2. The Related Art

A memory card is connected to an electric device via a memory card connector. A conventional memory card connector was disclosed in Taiwanese Patent No. M253124. The memory card connector includes an insulation body, a cover and a plurality of insertion terminals. The insulation body has at least one bulge at its outside. The cover has two flank boards. Each flank board is defined at least one hole. When the cover mates with the insulation body, the bulge is jammed in the hole.

However, if the memory card is ejected from the insulation body, the user must make sure that the cover will be off the insulation body, so the above design isn't convenient to use.

SUMMARY OF THE INVENTION

A memory card connector according to the present invention includes a housing, a cover, a plurality of front electric terminals and a plurality of back electric terminals. The housing has a base. The front terminal troughs receiving the front electric terminals are formed in front of the base, and the back terminal troughs receiving the back electric terminals are formed at the back of the base. The base has a left fixing hole and a right fixing hole at its back. Both sides of the base extend upwards to form a first wall and a second wall. The first wall and the second wall are parallel with the terminal troughs. A left passageway is formed at the back of the first wall. A right passageway apposed to the left passageway is formed at the back of the second wall. The cover has an upper base. The left side of the upper base extends downwards to form a left front board and a left back board. The right of the upper base extends downwards to form a right front board, a right middle board and a right back board. The left back board has a left rivet at its outside and a left fixing arm extending from its back. The right back board has a right rivet at its outside and a right fixing arm extending from its back. The cover and the housing are assembled after the rivets are received in the corresponding passageways respectively. When the cover is opened, the left fixing arm is inserted into the left fixing hole and the right fixing arm is inserted into the right fixing hole, so the cover can't come off the housing.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
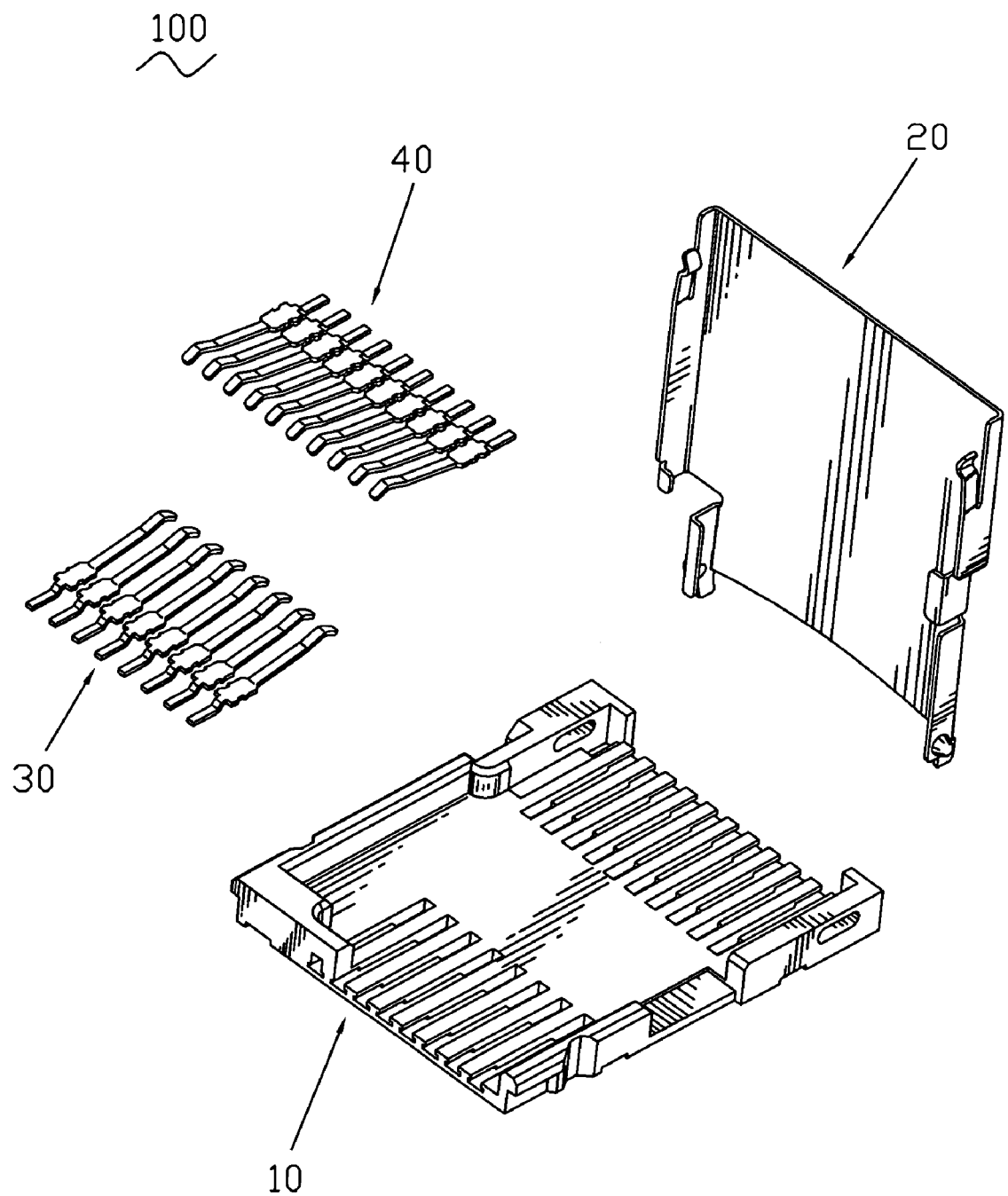
FIG. 1 is an exploded view of a memory card connector according to the present invention.

With reference to FIG. 1, a memory card connector 100 which is used to receive a memory card includes a housing 10, a cover 20, a plurality of front electric terminals 30 and a plurality of back electric terminals 40.

Figures 2, 3:
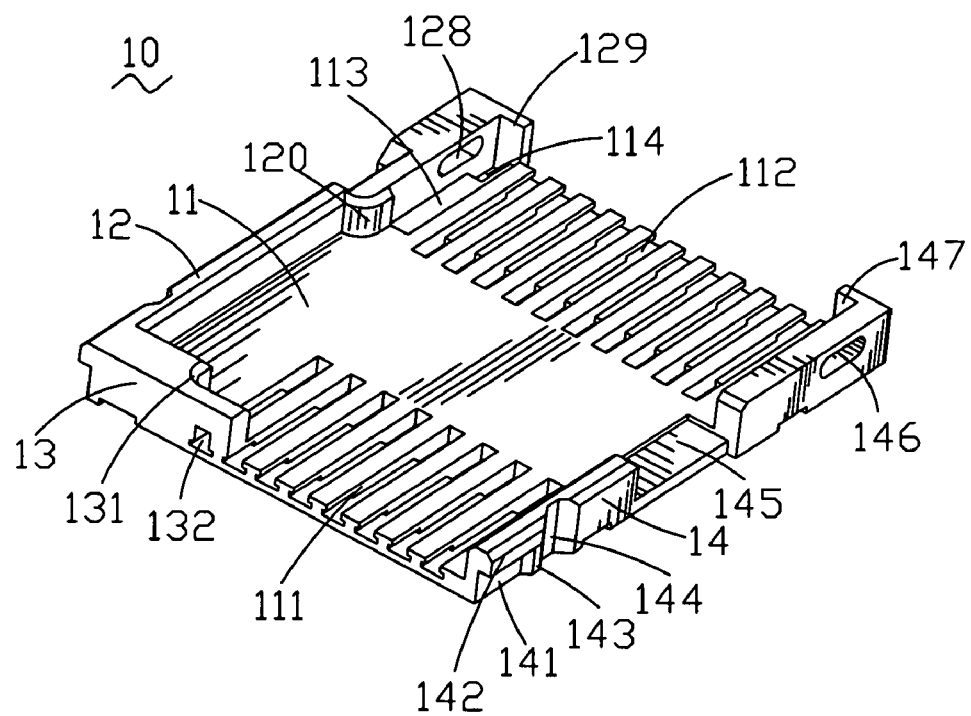
FIG. 2 is a perspective view of a housing of the memory card connector.
FIG. 3 is a perspective view of the housing of the memory card connector from another view.

With reference to FIG. 2 and FIG. 3, the housing 10 has a base 11. A plurality of front terminal troughs 111 and a plurality of back terminal troughs 112 are formed side by side on the top surface of the base 11 for receiving the front electric terminals 30 and back electric terminals 40. A left fillister 113 is formed at the back of the base 11. A left fixing hole 114 is formed at the back of the left fillister 113. A right fixing hole 115 opposed to the left fixing hole 114 is formed at the back of the base 11. Both sides of the base 11 extend upwards to form a first wall 12 and a second wall 14. The first wall 12 is adjacent to the left fillister 113. The first wall 12 has a left corner portion 120 at its right surface thereof to prevent erroneous insertion. The first wall 12 also has two L-shaped notch formed at its outside. The first L-shaped notch includes a left lateral slot 121, a first left stopping portion 122, a left mating portion 123 and a left upright slot 124. The left lateral slot 121 connects to the left upright slot 124. The left mating portion 123 is formed at the bottom of the left lateral slot 121. The second L-shaped notch includes a lateral guide slot 125, a second left stopping portion 126 and an upright guide slot 127. The lateral guide slot 125 connects to the upright guide slot 127. The first wall 12 has a left passageway 128 adjacent to the second notch. The distal portion of the first wall 12 extends rightwards to form a left protecting portion 129. The second wall 14 has a third L-shaped notch formed at its outside. The third L-shaped notch includes a right lateral slot 141, a right stopping portion 142, a right mating portion 143 and a right upright slot 144. The right lateral slot 141 connects to the right upright slot 144. The right mating portion 143 is formed at the bottom of the right lateral slot 141. The right fillister 145 is formed in the middle of the second wall 14, and the right fillister 145 is a little lower than top surface of the base 11. The second wall 14 has a right passageway 146 opposed to the left passageway 128. The distal portion of the second wall 14 extends leftwards to form a right protecting portion 147. The base 11 has a front wall 13 at its front. The front wall 13 has a front corner portion 131 at its back surface thereof to prevent erroneous insertion. There is a square hole 132 connecting with the left end of the front electric troughs 111.

Figure 4:
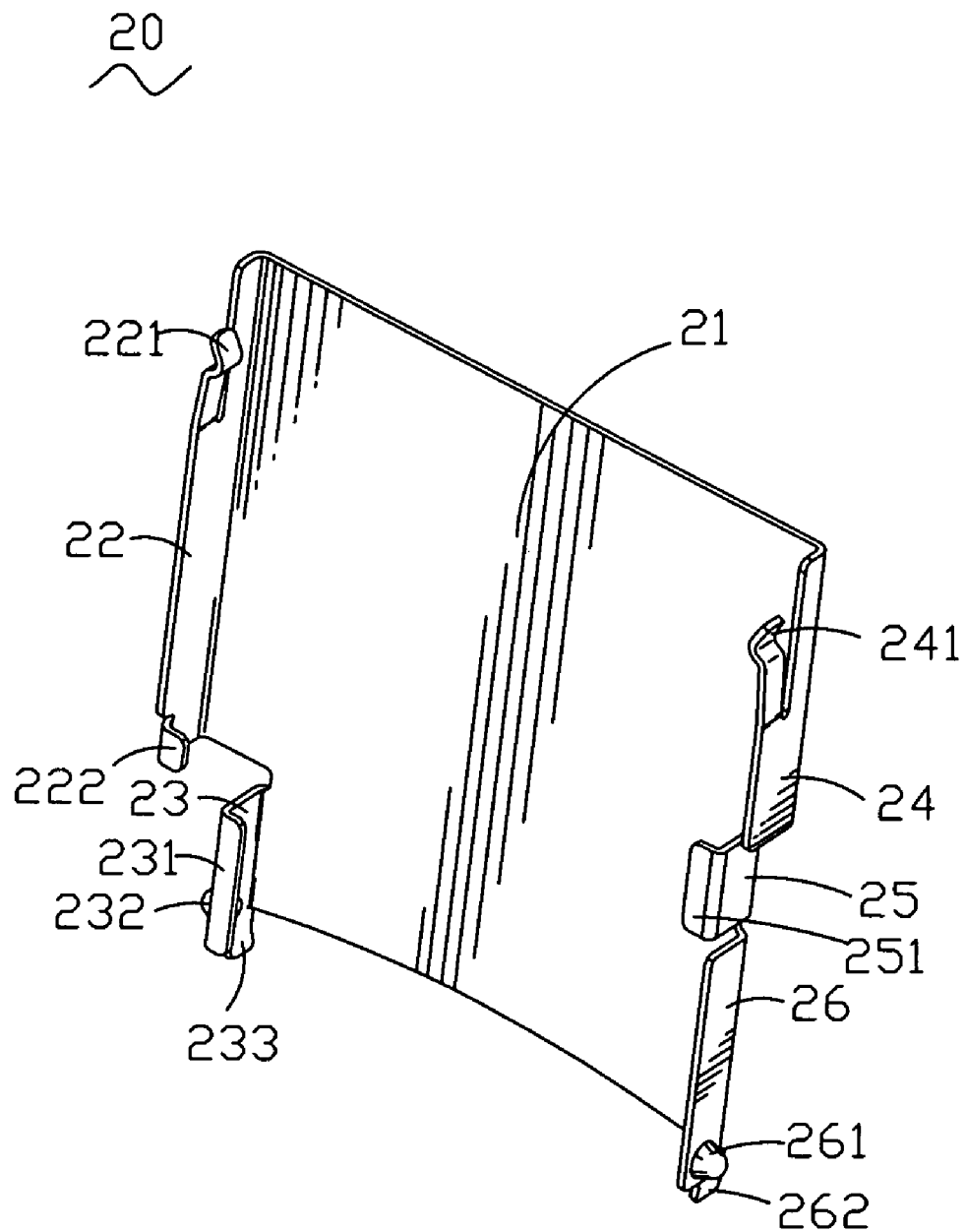
FIG. 4 is a perspective view of a cover of the memory card connector.
Figure 5:
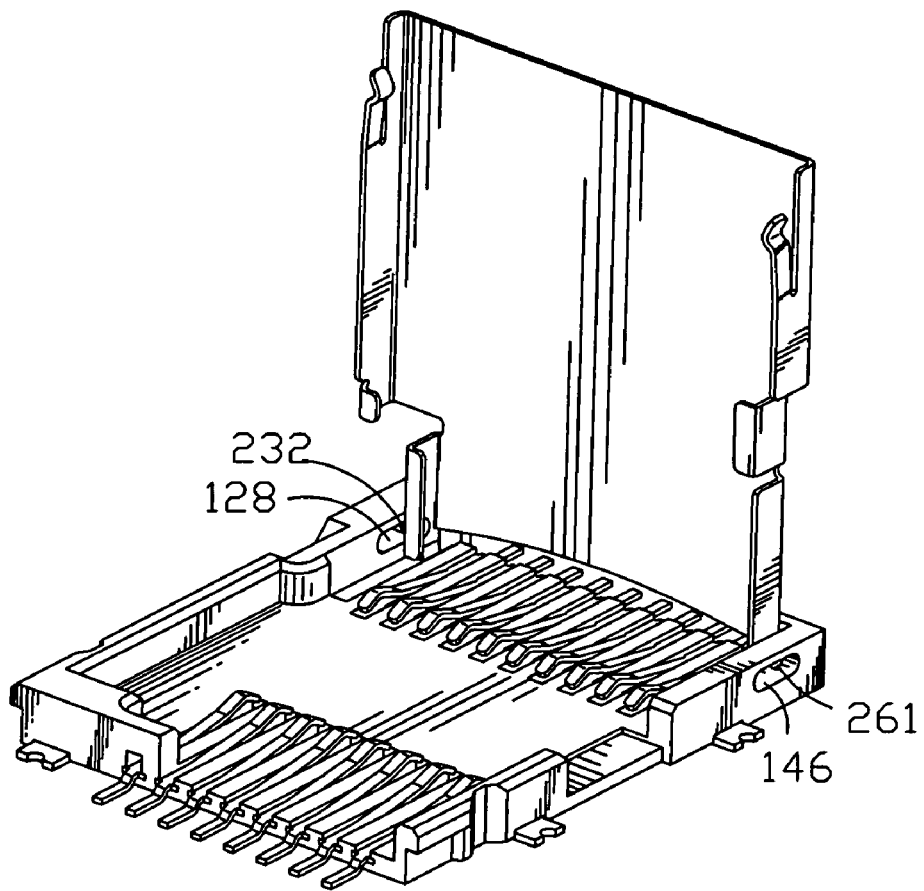
FIG. 5 is a perspective view showing the memory card connector at open state.
Figure 6:
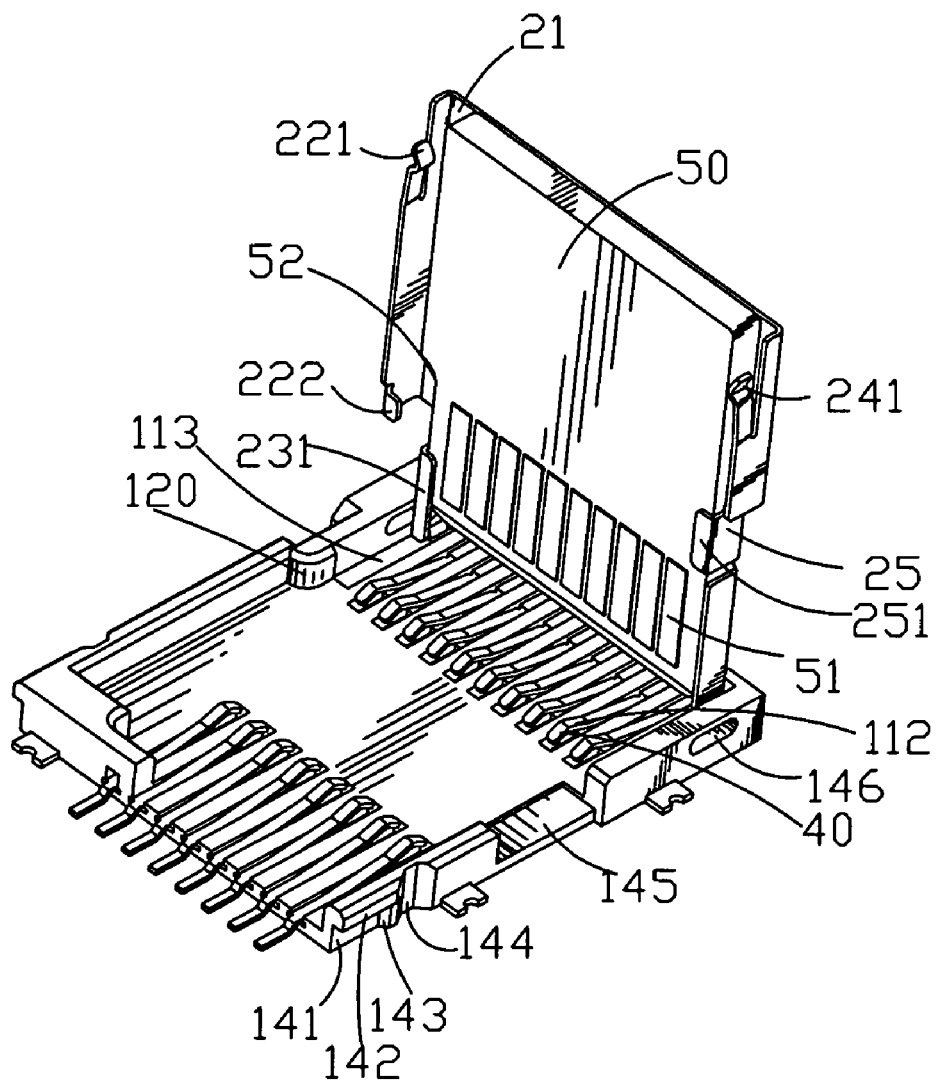
FIG. 6 is a perspective view showing the memory card connector with a MCC card inserted therein.
Figure 7:
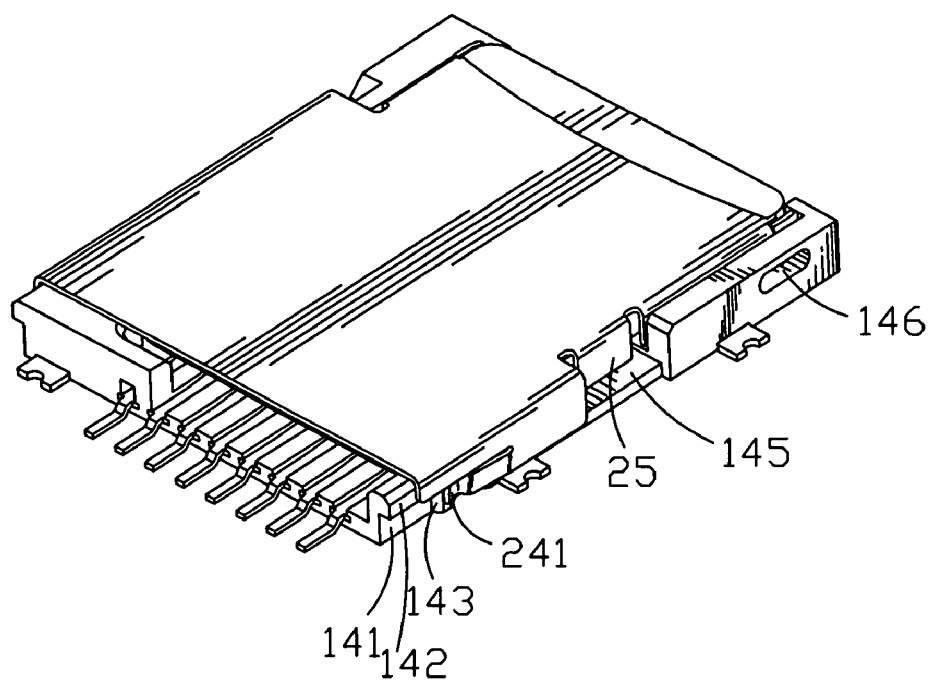
FIG. 7 is a perspective view showing the cover doesn't move forward after the memory card connector with a MCC card inserted therein.
Figure 8:
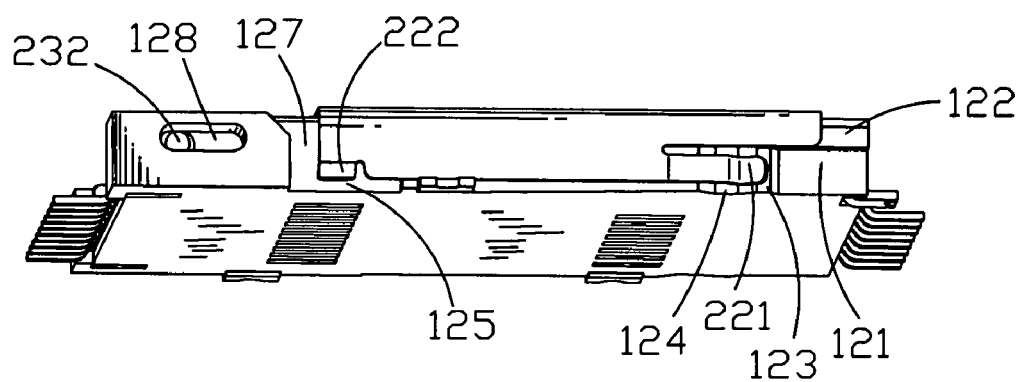
FIG. 8 is a perspective view showing the memory card connector with a MCC card inserted therein and the cover doesn't move forward from another view.
Figure 9:
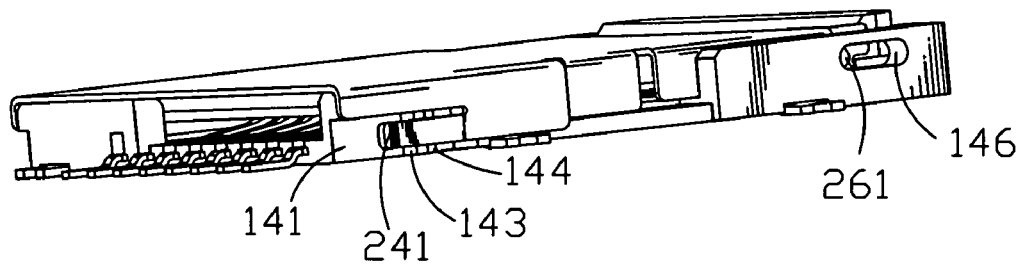
FIG. 9 is a perspective view showing the memory card connector with a MCC card inserted therein and the cover moves forward.
Figure 10:
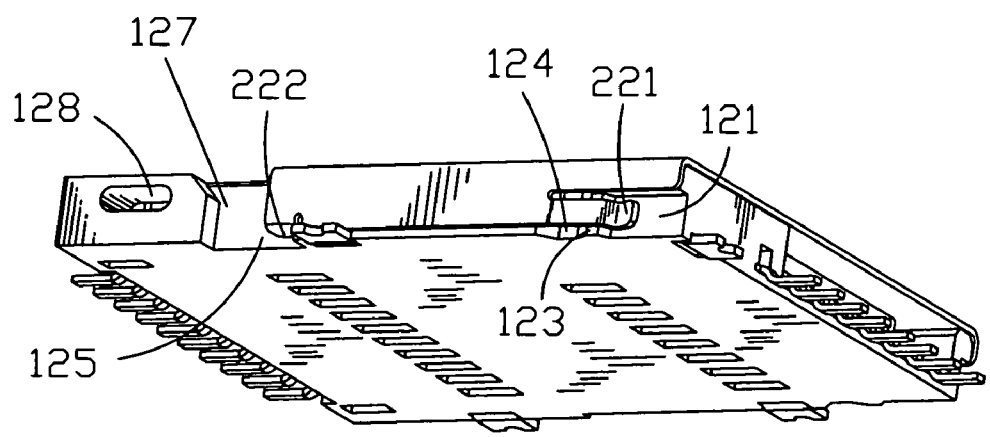
FIG. 10 is a perspective view showing the memory card connector with a MCC card inserted therein and the cover moves forward from another view.

With reference to FIG. 4, the cover 20 includes an upper base 21. The left side of the upper base 21 extends downwards to form a left front board 22 and a left back board 23. A left cantilever 221 in accordance with the first L-shaped notch is formed in front end of the left front board 22. A guide board 222 is formed at a distal end of the left front board 22 to correspond to the second L-shaped notch. The bottom of the left back board 23 extends rightwards to form a left bracket board 231. The left back board 23 has a left rivet 232 to correspond to the left passageway 128. The back of the left back board 23 extends backwards to form a left fixing arm 233. The right of the upper base 21 extends downwards to form a right front board 24, a right middle board 25 and a right back board 26. The right front board 24 has a right cantilever 241 to correspond to the third L-shaped notch. The bottom of the right middle board 25 extends leftwards to form a right bracket board 251. The right back board 26 has a right rivet 261 at its outside to correspond to the right passageway 146. The back of the right back board 26 extends backwards to form a right fixing arm 262.

With reference to FIGS. 1 to 5, when the cover 20 mates with the housing 10, the left passageway 128 receives the left rivet 232, and the right passageway 146 receives the right rivet 261. The length of the left passageway 128 and the right passageway 146 is longer than that of the left rivet 232 and the right rivet 261, while the left rivet 232 is received in the left passageway 128 and the right rivet 261 is received in the right passageway 146, the left rivet 232 and the right rivet 261 move freely in the left passageway 128 and right passageway 146. The left fixing hole 114 and the right fixing hole 115 receive the left fixing arm 233 and the right fixing arm 262 respectively so that the cover 20 doesn't come off the housing 10 even if the cover 20 is opened.

With reference to FIGS. 6 to 10, when a MCC card 50 including multiple MCC signal terminals 51 and a MCC cut-off 52 is inserted into the memory card connector 100. First of all, the MCC signal terminals 51 are positioned at the bottom of the cover 20. At this time, the left fixing arm 233 and the right fixing arm 262 prevent the MCC card 50 from coming off the cover 20 in the lateral direction, the left bracket board 231 and the right bracket board 251 prevent the MCC card 50 from coming off the cover 20 in the upright direction. After the cover 20 is pivoted downwards to abut the housing 10, two sides of the cover 20 touch the first wall 12 and the second wall 14. The guide board 222 is accepted in the upright guide slot 127. The left bracket board 231 is accepted in the left fillister 113, and the right bracket board 251 is accepted in the right fillister 145, the left cantilever 221 arrives at the left upright slot 124. The right cantilever 241 arrives at the right upright slot 144. The left protecting portion 129 and the right protecting portion 147 protect the cover 20 from coming off the housing 10 in the lateral direction. Secondly, the cover 20 is pushed forward along the housing 10. The left cantilever 221 touches the left lateral slot 121. The right cantilever 241 touches the right lateral slot 141. The guide board 222 contacts with the lateral guide slot 125, and the first left stopped portion 122 and the right stopped portion 142 prevent the left cantilever 221 and the right cantilever 241 from moving in the upright direction, the second left stopped portion 126 prevents the left guide board 222 from moving in the upright direction. The MCC cut-off 52 contacts with the left corner portion 120, so the MCC card 50 is successfully located in the memory card connector 100. When the MCC card 50 is ejected from the housing 10, the cover 20 moves backwards, the left cantilever 221 is received in the left upright slot 124, and the right cantilever 241 is received in the right upright slot 144. The guide board 222 is received in the upright guide slot 127. After the cover 20 is rotated upwards, the left fixing arm 233 is inserted in the left fixing hole 114, and the right fixing arm 262 is inserted in the right fixing hole 115. So the cover 20 doesn't come off the housing 10 even if the cover 20 is opened. And then the MCC card 50 can be taken out from the memory card connector 100.

Figure 11:
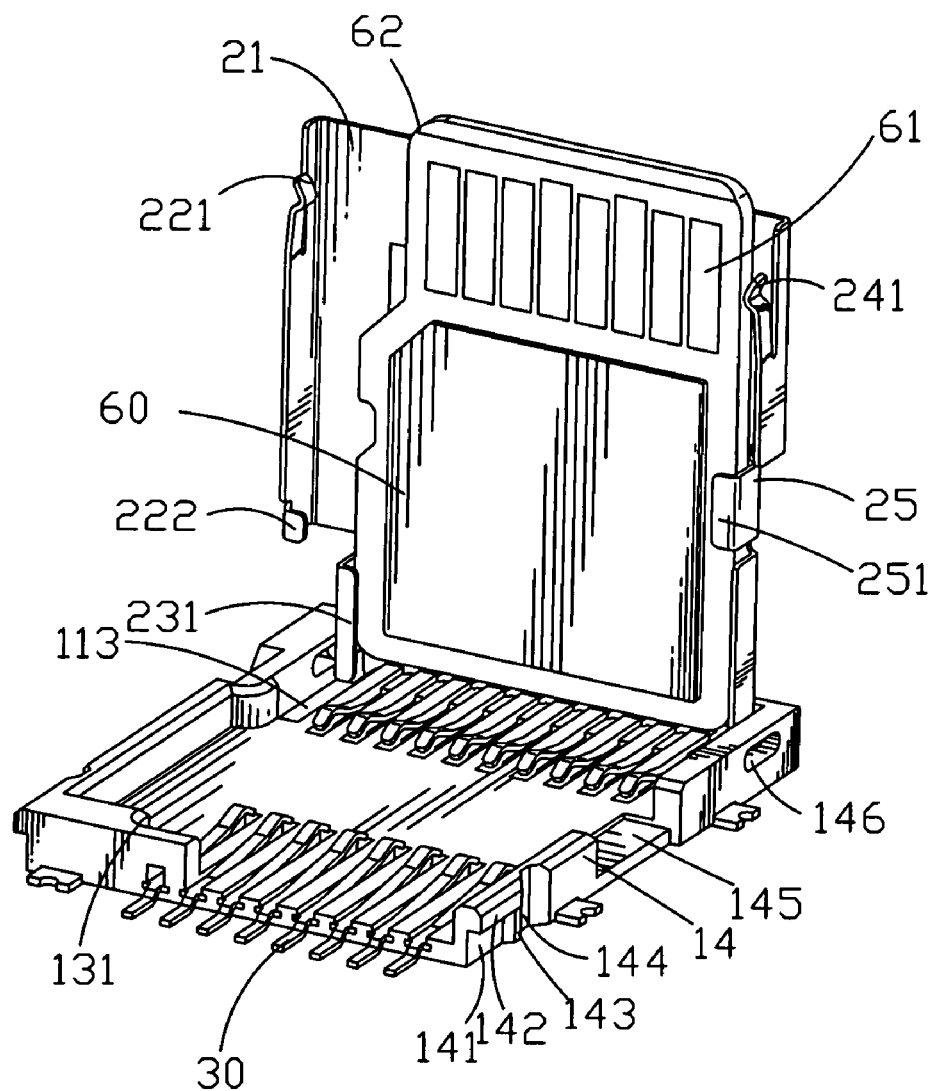
FIG. 11 is a perspective view showing the memory card connector with a T-Flash card inserted therein.

With reference to FIG. 11, a T-Flash card 60 includes multiple T-Flash signal terminals 61 and a T-Flash cut-off 62, when the T-Flash card 60 is inserted into the memory card connector 100, the T-Flash signal terminals 61 are positioned on the top of the cover 20. Using the above way of covering, the T-Flash card 60 is inserted into the memory card connector 100, after the T-Flash card 60 is successfully inserted into the memory card connector 100, the T-Flash card 60 contacts with the front corner portion 131. Using the above way of opening, the T-Flash card 60 is ejected from the memory card connector 100.

What is claimed is:

1. A memory card connector comprising:
   a housing having a base, a first wall having a left passageway arranged on the left side of the base, a second wall having a right passageway arranged on the right side of the base, terminal troughs formed on the top surface of the base, a left fixing hole and a right fixing hole defined at the back of the base; and
   a cover having an upper base, a left front board and a left back board arranged on the left side of the upper base, a right front board and a right middle board and a right back board arranged on the right of the upper base, a left rivet formed at the outside of the left back board, a right rivet formed at the outside of the right back board, a left fixing arm defined at the back of the left back board, and a right fixing arm defined at the back of the right back board;
   wherein the left rivet and the right rivet are respectively jammed in the left passageway and the right passageway so that the cover can pivot on the housing, and when the left fixing arm and the right fixing arm are respectively jammed in the left fixing hole and the right fixing hole, the cover can't come off the housing even if the cover is opened.

2. The memory card connector as claimed in claim 1, wherein a first L-shaped notch is defined at the outside of the front portion of the first wall, and the left front board has a left cantilever at its front to correspond to the first L-shaped notch.

3. The memory card connector as claimed in claim 1, wherein a second L-shaped notch is defined at the outside of the back portion of the first wall, and the left front board has a guide board at its back to correspond to the second L-shaped notch.

4. The memory card connector as claimed in claim 1, wherein a third L-shaped notch is defined at the outside of the front portion of the second wall, and the right front board has a right cantilever to correspond to the second L-shaped notch.

5. The memory card connector as claimed in claim 1, further comprising a left fillister defined on the top surface of the base, and a left bracket board is defined at the bottom of the left back board to correspond to the left fillister.

6. The memory card connector as claimed in claim 1, further comprising a right fillister formed in the middle of the second wall, and a right bracket board is formed at the bottom of the right middle board to correspond to the right fillister.

* * * * *